US009378002B2

(12) United States Patent
Uola (10) Patent No.: US 9,378,002 B2
(45) Date of Patent: Jun. 28, 2016

(54) SYSTEM, METHOD, APPARATUS AND COMPUTER PROGRAM PRODUCT FOR PROVIDING MEMORY FOOTPRINT REDUCTION

(75) Inventor: Juha Uola, Tampere (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1747 days.

(21) Appl. No.: 11/615,347

(22) Filed: Dec. 22, 2006

(65) Prior Publication Data

US 2008/0155521 A1    Jun. 26, 2008

(51) Int. Cl.
*G06F 9/45* (2006.01)
*G06F 9/445* (2006.01)
*G06F 11/34* (2006.01)

(52) U.S. Cl.
CPC .......... *G06F 8/4434* (2013.01); *G06F 9/44578* (2013.01); *G06F 11/3476* (2013.01); *G06F 9/44557* (2013.01); *G06F 9/44573* (2013.01)

(58) Field of Classification Search
None
See application file for complete search history.

(56) References Cited

U.S. PATENT DOCUMENTS

| | | | | |
|---|---|---|---|---|
| 5,752,035 A * | 5/1998 | Trimberger | ............. | G06F 8/447 712/229 |
| 5,974,428 A * | 10/1999 | Gerard et al. | ................. | 717/170 |
| 6,233,725 B1 * | 5/2001 | Beadle et al. | ................. | 717/118 |
| 6,279,030 B1 * | 8/2001 | Britton et al. | ................. | 709/203 |
| 6,298,477 B1 * | 10/2001 | Kessler | .......................... | 717/145 |
| 6,360,360 B1 * | 3/2002 | Bates et al. | .................... | 717/160 |
| 6,526,565 B1 * | 2/2003 | Nally | ........................ | G06F 8/61 717/108 |
| 6,658,492 B1 * | 12/2003 | Kawahara | ........... | G06F 9/44573 717/159 |
| 6,826,750 B1 * | 11/2004 | Curtis et al. | .................. | 717/170 |
| 6,922,829 B2 * | 7/2005 | Ward et al. | ..................... | 717/154 |
| 7,539,975 B2 * | 5/2009 | Atkin et al. | .................... | 717/118 |
| 7,788,658 B2 * | 8/2010 | Javed et al. | .................... | 717/159 |
| 7,900,188 B2 * | 3/2011 | Costa et al. | ................... | 717/106 |
| 7,954,095 B2 * | 5/2011 | Archer et al. | ................. | 717/149 |
| 7,975,256 B2 * | 7/2011 | Atkin et al. | ................... | 717/122 |
| 7,979,852 B2 * | 7/2011 | Bodin | ..................... | G06F 8/443 717/150 |
| 2001/0032332 A1 * | 10/2001 | Ward et al. | ........................ | 717/9 |
| 2002/0154551 A1 * | 10/2002 | Kimelman et al. | ........... | 365/200 |
| 2003/0046673 A1 * | 3/2003 | Copeland et al. | ............. | 717/163 |
| 2008/0115120 A1 * | 5/2008 | Clifton et al. | ................. | 717/153 |
| 2008/0250399 A1 * | 10/2008 | Huang et al. | .................. | 717/151 |

OTHER PUBLICATIONS

Tip, F. et al., Practical Extraction Techniques for Java, ACM Transaction on Programming Languages and Systems, vol. 24, No. 6 (Nov. 2002), pp. 625-666.*

(Continued)

*Primary Examiner* — Todd Aguilera
(74) *Attorney, Agent, or Firm* — Core Wireless Licensing Ltd (57) ABSTRACT

An apparatus for providing memory footprint reduction for classes of an application programming interface includes a comparing element and a set selection element. The comparing element may be configured to receive a reference class file and one or more modified class files for each of a plurality of classes and to compare a size of each of the one or more modified class files and the reference class file. The set selection element may be in communication with the comparing element. The set selection element may be configured to select one of the one or more modified class files or the reference class file based at least in part on the size of each of the one or more modified class files and the reference class file as a selected file for each corresponding one of the classes and to form a class set comprising the selected file for each corresponding one of the classes.

21 Claims, 7 Drawing Sheets

(56) References Cited

OTHER PUBLICATIONS

Innaworks, mBooster Users Guide [online], Aug. 2005 [retrieved Sep. 22, 2010]. Retrieved from Internet: <http://web.archive.org/web/20060209182748/www.innaworks.com/mBooster-2-0-Doc-Ch3-mBooster+User+Guide.html>, pp. 1-7.*

Burgaard, K, et al., Virtual Machines for Limited Devices, Research Report Dept. of Computer Science, University of Aarhus, Denmark [online], Dec. 2000 [retrieved on Sep. 22, 2010]. Retrived from Internet: <http://citeseerx.ist.psu.edu/viewdoc/summary?doi=10.1.1.22.4609>, pp. 1-10.*

Debray, S., et al., "Profile-Guided Code Compression," ACM SIGPLAN 2002 Conference on Programming Language Design and Implementation [online], 2002 [retrieved Sep. 20, 2013], Retrieved from Internet: <http://dl.acm.org/citation.cfm?id=512542>, pp. 95-105.*

* cited by examiner

(PRIOR ART)

FIG. 7.

SYSTEM, METHOD, APPARATUS AND COMPUTER PROGRAM PRODUCT FOR PROVIDING MEMORY FOOTPRINT REDUCTION

TECHNOLOGICAL FIELD

Embodiments of the present invention relate generally to resource management, and, more particularly, relate to method, apparatus, and computer program product for providing memory footprint reduction for classes of an application programming interface or application code.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer and convenience to users relates to provision of various applications or software to users of electronic devices such as a mobile terminal. The applications or software may be executed from a local computer, a network server or other network device, or from the mobile terminal such as, for example, a mobile telephone, a mobile television, a mobile gaming system, etc, or even from a combination of the mobile terminal and the network device. In this regard, various applications and software have been developed and continue to be developed in order to give the users robust capabilities to perform tasks, communicate, entertain themselves, etc. in either fixed or mobile environments. However, many electronic devices which have different operating systems may require different versions of a particular application to be developed in order to permit operation of the particular application at each different type of electronic device. If such different versions were developed to correspond to each different operating system, the cost of developing software and applications would be increased.

Accordingly, virtual machines (VMs) have been developed. A VM is a self-contained operating environment that behaves as if it is a separate computer. The VM may itself be a piece of computer software that isolates the application being used by the user from the host computer or operating system. Typically, the VM consists of the execution engine and implementations of the standardized APIs. For example, Java applets run in a Java VM while having no access to the host operating system. Because versions of the VM are written for various computer platforms, any application written for the VM can be operated on any of the platforms, instead of having to produce separate versions of the application for each computer and operating system. One of the most popular languages based on a VM is Java. Java, which is well known in the industry, is extremely portable, flexible and powerful with respect to allowing applications to, for example, access mobile phone features through well-known standard APIs. Thus, Java has been widely used by developers to develop portable applications that can be run on a wide variety of electronic devices or computers without modification.

Particularly in mobile environments where resources are scarce due to consumer demand to reduce the cost and size of mobile terminals, it is important to conserve or reuse resources whenever possible. In this regard, efforts have been exerted to try to conserve or reclaim resources of mobile terminals when the resources are no longer needed by a particular application. Memory is one such resource for which it may be desirable to reduce consumption. In this regard, since more and more Java applications and application programming interfaces (APIs) are being supported by mobile terminals, a memory footprint of Java class libraries has been increasing.

In an effort to reduce the memory footprint of a Java class library or application, a technique known as "romizing" has been developed. During romizing, Java class files are typically transformed to Java VM specific format during the build phase. Some optimizations may be applied to class files during romizing since certain dynamic features of Java language may not be required for the class library. Examples of such optimizations may include combining constant pools of all classes and replacing duplicate strings with references pointing to an original string. All class files may be combined into a single large image. As a result of romizing, a size of the class library may be decreased and class loading performance of the Java VM may be improved.

Figure 7:
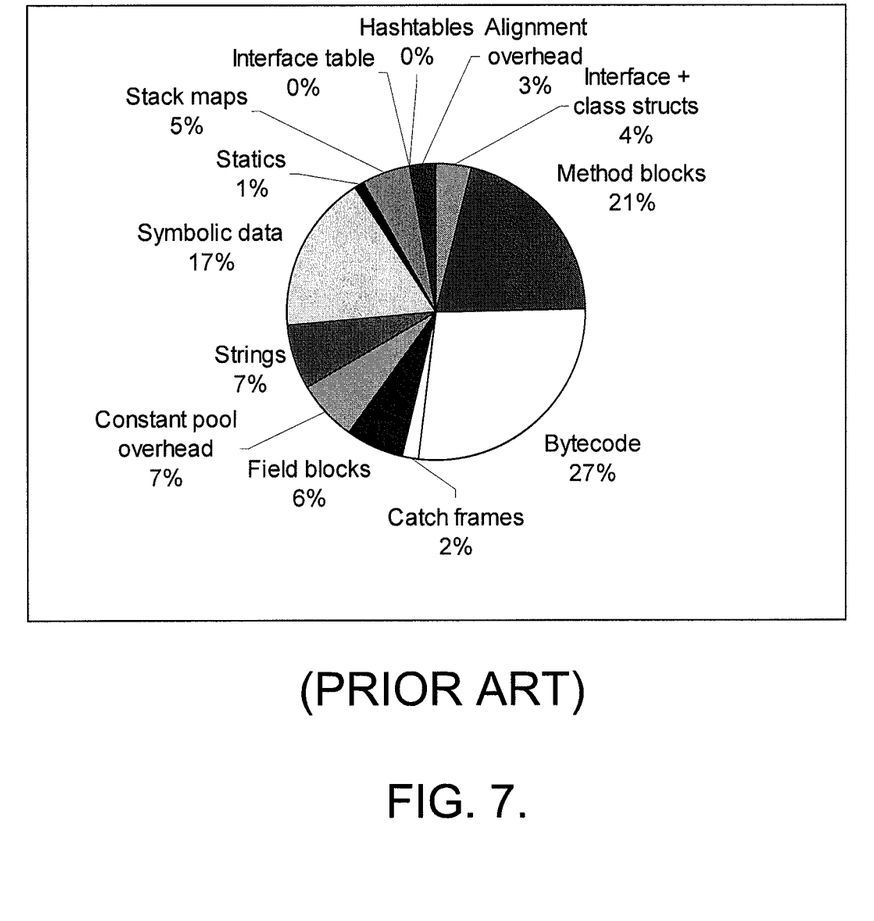
FIG. 7 is a graph illustrating an example of a static memory footprint of a typical class library in romized form.

However, romizing only decreases the size of some parts of the class file, which may include many separate parts that can be handled separately. For example, Java bytecode, which is an abstract or intermediate language, is one part of a Java class file. FIG. 7 is a graph illustrating an example of a static memory footprint of a typical class library in romized form. In this regard, although Java bytecode may represent about 27% of the Java class library memory footprint, Java bytecode size is not affected by romizing and is therefore not optimized in terms of size.

Given the above described problems, it may be advantageous to provide an improved mechanism for providing memory footprint reduction for languages, such as Java, that are based on using bytecode and need to store or transfer bytecode. Both applications and class libraries implementing APIs include bytecode, so both can benefit from improved memory footprint reduction mechanism.

BRIEF SUMMARY

A method, apparatus and computer program product are therefore provided for providing memory footprint reduction for classes of an application programming interface or application code. As such, for example, a reduced amount of memory may be consumed for storage of Java classes. According to exemplary embodiments of the present invention, bytecode optimizers and/or compilers may be applied to each class file to produce a modified version of the class file. A size of the modified version may be compared to the reference class file and the smaller of the reference class file and the modified version may be selected for loading. In some cases, there may be a plurality of modified versions from which to select. The above procedure may be performed for each class file and an optimized class set may be determined from among the selected class files for each class.

In another embodiment, each reference class file may include profile data indicative of performance criticality of the associated reference class file. Accordingly, optimization in terms of file size reduction may be performed in a discriminative manner based on whether a particular file is performance critical (e.g., therefore favoring performance factors over file size reduction) or whether the particular file is not performance critical (e.g., therefore favoring file size reduction).

In one exemplary embodiment, a method of providing memory footprint reduction is provided. The method includes receiving a reference class file and one or more modified class files for each of a plurality of classes, selecting one of the one or more modified class files or the reference class file based at least in part on a size of each of the one or more modified class files and the reference class file as a selected file for each corresponding one of the classes, and forming a class set comprising the selected file for each corresponding one of the classes.

In another exemplary embodiment, a computer program product for providing memory footprint reduction is provided. The computer program product includes at least one computer-readable storage medium having computer-readable program code portions stored therein. The computer-readable program code portions include first, second and third executable portions. The first executable portion is for receiving a reference class file and one or more modified class files for each of a plurality of classes. The second executable portion is for selecting one of the one or more modified class files or the reference class file based at least in part on a size of each of the one or more modified class files and the reference class file as a selected file for each corresponding one of the classes. The third executable portion is for forming a class set comprising the selected file for each corresponding one of the classes.

In another exemplary embodiment, an apparatus for providing memory footprint reduction is provided. The apparatus includes a comparing element and a set selection element. The comparing element may be configured to receive a reference class file and one or more modified class files for each of a plurality of classes and to compare a size of each of the one or more modified class files and the reference class file. The set selection element may be in communication with the comparing element. The set selection element may be configured to select one of the one or more modified class files or the reference class file based at least in part on the size of each of the one or more modified class files and the reference class file as a selected file for each corresponding one of the classes and to form a class set comprising the selected file for each corresponding one of the classes.

In another exemplary embodiment, an apparatus for providing memory footprint reduction is provided. The apparatus includes means for receiving a reference class file and one or more modified class files for each of a plurality of classes, means for selecting one of the one or more modified class files or the reference class file based at least in part on a size of each of the one or more modified class files and the reference class file as a selected file for each corresponding one of the classes and means for forming a class set comprising the selected file for each corresponding one of the classes.

In another exemplary embodiment, a system for providing memory footprint reduction is provided. The system includes one or more class file output tools and a class selection element. Each of the class file output tools may be capable of generating a reference class file or corresponding one or more modified class files for each of a plurality of classes. The class selection element may be in communication with the one or more class file output tools. The class selection element may include a comparing element and a set selection element. The comparing element may be configured to receive the reference class file and the one or more modified class files corresponding to the reference class file for each of the classes. The comparing element may also be configured to compare a size of each of the one or more modified class files and the reference class file. The set selection element may be in communication with the comparing element. The set selection element may be configured to select one of the one or more modified class files or the reference class file based at least in part on the size of each of the one or more modified class files and the reference class file as a selected file for each corresponding one of the classes. The set selection element may also be configured to form a class set comprising the selected file for each corresponding one of the classes.

Embodiments of the invention may provide a system, method, apparatus and computer program product for employment during or prior to loading of a Java VM or other APIs. As a result, for example, mobile terminals and other electronic devices may benefit from an ability to utilize corresponding applications or APIs with a reduced memory footprint. Accordingly, a robust capability for executing various applications associated with Java or other APIs may be provided while consuming relatively smaller amounts of memory resources.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
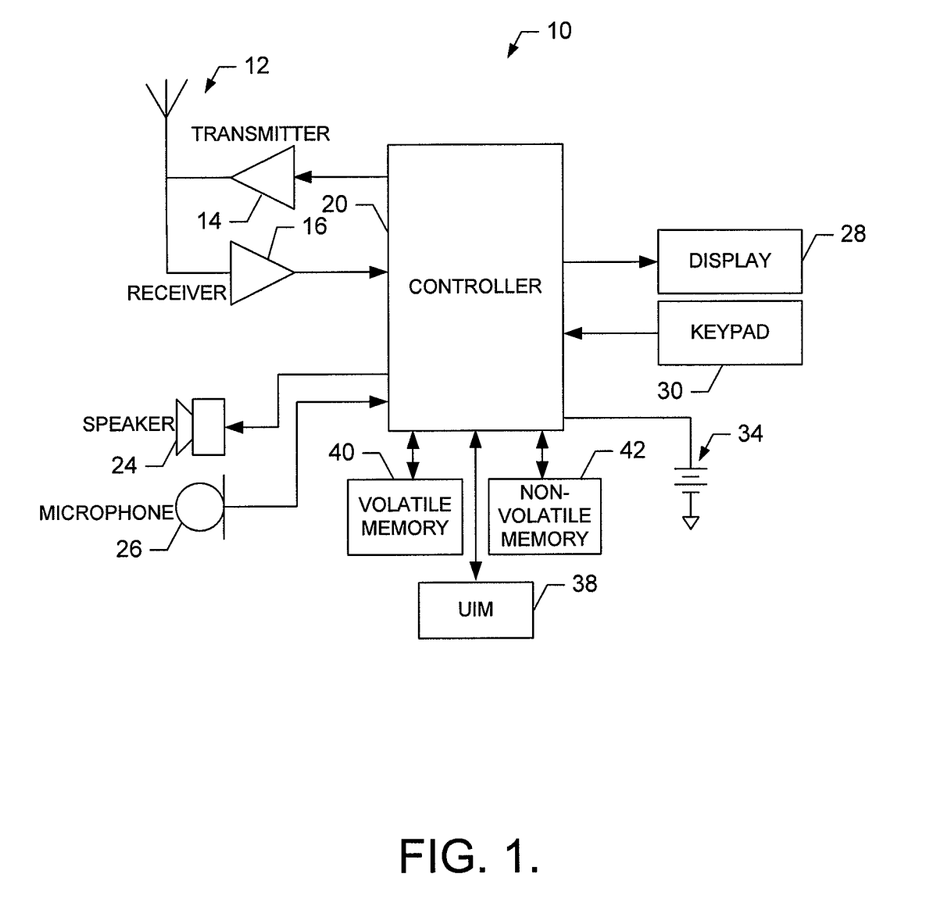
FIG. 1 is a schematic block diagram of a mobile terminal according to an exemplary embodiment of the present invention.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, WCDMA and TD-SCDMA, with fourth-generation (4G) wireless communication protocols or the like.

It is understood that the controller 20 includes circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
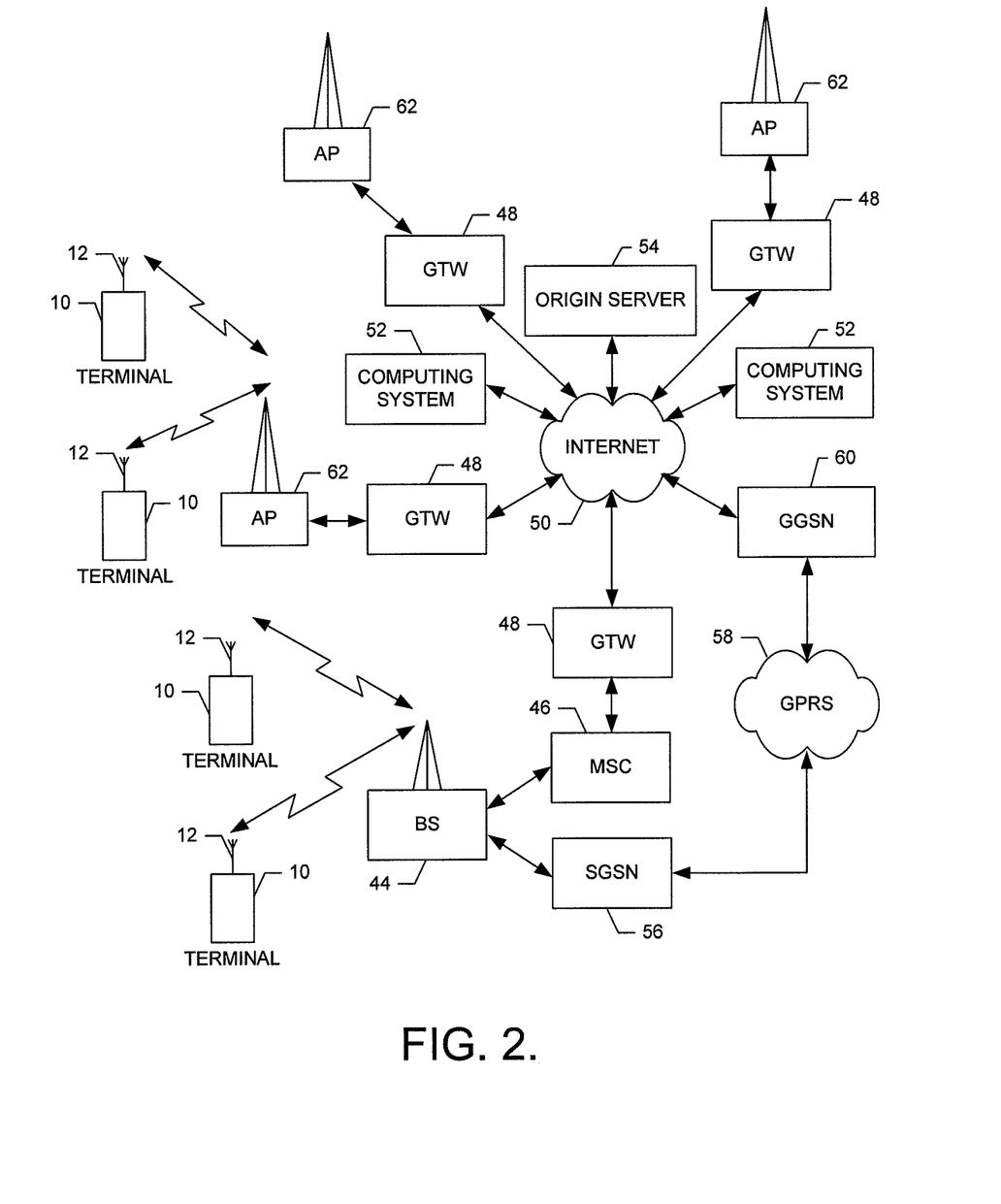
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX, UWB techniques and/or the like.

In an exemplary embodiment, data associated with a Java application or other application may be communicated over the system of FIG. 2 between a mobile terminal, which may be similar to the mobile terminal 10 of FIG. 1 and a network device of the system of FIG. 2, or between mobile terminals. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on and executed solely at a communication device such as the mobile terminal 10, or may be resident on and executed at a network device or other device.

Figure 3:
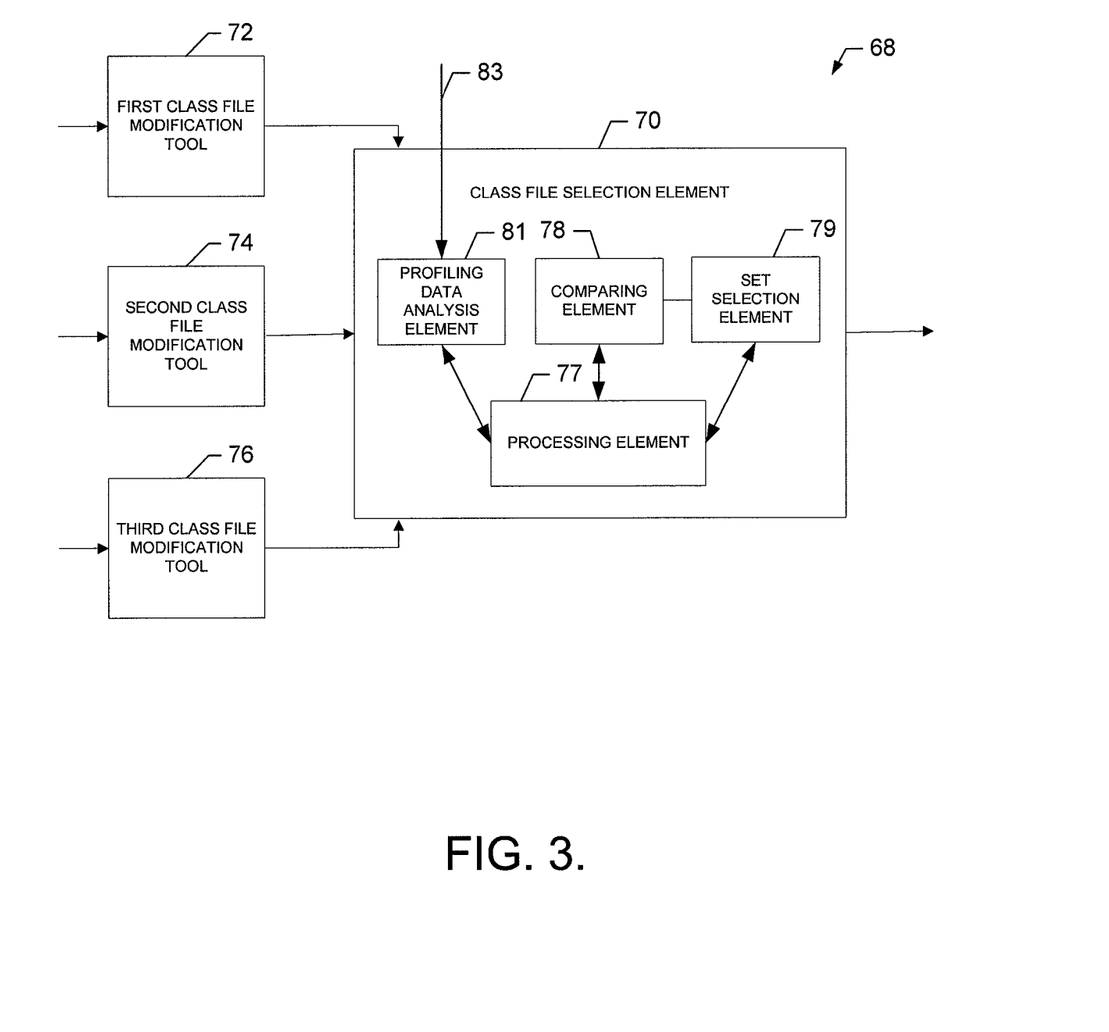
FIG. 3 illustrates a block diagram of a system for providing memory footprint reduction for classes of an application or API according to an exemplary embodiment of the present invention.

FIG. 3 illustrates a block diagram of a system for providing memory footprint reduction for classes of an application programming interface or application according to an exemplary embodiment of the present invention. An exemplary embodiment of the invention will now be described with reference to FIG. 3, in which certain elements of a system for providing memory footprint reduction for classes of an application programming interface are displayed. The system of FIG. 3 will be described, for purposes of example, in connection with the mobile terminal 10 of FIG. 1. However, it should be noted that the system of FIG. 3, may also be employed in connection with a variety of other devices, both mobile and fixed, and therefore, embodiments of the present invention should not be limited to application on devices such as the mobile terminal 10 of FIG. 1. It should also be noted, that while FIG. 3 illustrates one example of a configuration of a system for providing memory footprint reduction for classes of an application programming interface, numerous other configurations may also be used to implement embodiments of the present invention. Additionally, although FIG. 3 will be described primarily in the context of memory footprint reduction for Java class files, embodiments of the present invention may also be employed for class files associated with other applications or APIs.

Referring now to FIG. 3, a system 68 for providing memory footprint reduction for classes of an application programming interface or application is provided. The system 68 includes one or more class file modification tools in communication with a class file selection element 70. A class file modification tool may be any device or means embodied in either hardware, software, or a combination of hardware and software that is capable of modifying at least a portion of bytecode for a particular class file. In an exemplary embodiment, the one or more class file modification tools may include a first class file modification tool 72, a second class file modification tool 74, and a third class file modification tool 76. In other words, according to one exemplary embodiment, the one or more class file modification tools may include a Java bytecode optimizer (e.g., Bytecode-Level Optimizer and Analysis Tool (BLOAT), Soot, JoGa, JCMP, etc.), and/or a Java obfuscator (e.g., JShrink, DashO, ect.) However, any number of class file modification tools may be used and any other known types of Java bytecode optimizers, obfuscators and/or compilers may be included with and/or substituted for any of the class file modification tools listed above. Additionally, one or more of the class file modification tools may be preceded by a class file generation tool 75 (see FIG. 4) such as a Java compiler (e.g., javac, Jikes, Eclipse ecj, GCJ GNU, Janino, etc. The Java compiler may modify a reference file or generate a reference file. Reference files may also be generated by other class file generation tools such as a default class file generation tool. The class file modification tools and class file generation tools may be considered as class file output tools since both class file modification tools and class file generation tools produce an output including either a modified class file or a reference class file, respectively.

A bytecode optimizer tool may be any device or means embodied in either hardware, software, or a combination of hardware and software that is capable of transforming bytecodes inside a class file to a more optimized form in terms of the performance of the bytecode. Typically, the bytecode optimizer tool is designed to provide performance improvement for each optimized class. As such, the bytecode optimizer tool transforms class files internal to the particular class being optimized without affecting external classes. In some cases, improving performance of the particular class may also result in reducing bytecode size. However, whether a reduction in bytecode size occurs and/or an amount of bytecode size reduction may vary from class to class and from bytecode optimizer tool to bytecode optimizer tool. As a result, given two class files, for example, class file A and class file B, the first class file modification tool 72 may increase a size of class file A by 1.2% while decreasing a size of class file B by 0.8%. Meanwhile, the second class file modification tool 74 may decrease a size of class file A by 0.2% while increasing a size of class file B by 2.5%.

A compiler may be any device or means embodied in either hardware, software, or a combination of hardware and software that is capable of transforming Java source code into Java bytecode. Although compilers often generate un-optimized bytecode, it is possible that certain compilers may produce class files having a smaller size (e.g., memory footprint) than other compilers.

An obfuscator may be any device or means embodied in either hardware, software, or a combination of hardware and software that is capable of obfuscating code. An obfuscator may be designed to inhibit reverse engineering of the code, including source code such as bytecode, by converting it to obfuscated code. Obfuscated code is far less readable and therefore less apt to decompilation. However, obfuscation typically alters class file symbolic data which may, for example, change the way a class file interfaces with other classes. As such, embodiments of the present invention may be practiced in the context of obfuscators as class file modification tools only in situations where the obfuscator functionality is disabled such that the obfuscator only handles bytecode.

The class file selection element 70 may be any device or means embodied in either hardware, software, or a combination of hardware and software that is capable of selecting, for each class, a file having the smallest size from among the class files produced by class file output tools. In this regard, the class file selection element 70 may be configured to receive reference class files and/or one or more modified class files that are produced by the class file output tools. In an exemplary embodiment, the class file selection element 70 may be configured to select, for each class, a file having the smallest size from among the reference class file and one or more modified class files based at least in part on profiling data associated with the reference class file. Accordingly, the class file selection element 70 may be configured to determine an optimized class set given a reference class file and one or more modified class files. In an exemplary embodiment, the optimized class set may be defined as a collection of the smallest class file among the reference class file and the one or more modified class files for each class. In an alternative exemplary embodiment, the optimized class set may be defined as a collection of the smallest class file among the reference class file and the one or more modified class files for each class having profiling data indicating that the corresponding class is not performance critical.

The profiling data may be determined previously as a result of testing with respect to each of the classes. In this regard, if a particular class is determined to be performance critical, profiling data indicating the same may be included with the particular class. Accordingly, any modification of the class may be limited to performance enhancement modifications. In other words, size alone may not determine selection of class file selected for a performance critical class.

In an exemplary embodiment, the class file selection element 70 may further include a processing element 77, a comparing element 78 and a set selection element 79. In an exemplary embodiment, the processing element 77 could be the controller 20 or a processor of a build machine, which may control the operation of the comparing element 78 and the set selection element 79. The comparing element 78 and the set selection element 79 may each be any device or means embodied in either hardware, software, or a combination of hardware and software that is capable of performing the corresponding functions of the comparing element 78 and the set selection element 79, respectively, as described below. The comparing element 78 may be configured to compare one or more modified class files to each other and/or to the reference class file to determine which of the one or more modified class files and/or the reference class file has the smallest memory footprint for each class. The set selection element 79 may be configured to select the file determined to have the smallest memory footprint for each class to form an optimized class set 88. In an exemplary embodiment, the set selection element 79 may be further configured to select the file determined to have the smallest memory footprint for each class to form the optimized class set 88 based on profiling data as described above.

Each of the class file modification tools 72, 74, 76 and the class file selection element 70 may include and operate under the control of a corresponding processing element. Alternatively, some or all of the class file modification tools 72, 74, 76 and/or the class file selection element 70 may operate under the control of a common processing element such as, for example, the controller 20 of FIG. 1 or the processor of a build machine. Processing elements as described herein may be embodied in many ways. For example, a processing element may be embodied as a processor, a coprocessor, a controller or various other processing means or devices including integrated circuits such as, for example, an ASIC (application specific integrated circuit). Alternatively, a processing element, such as the controller 20, may perform all the functions of the class file selection element 70.

Figure 4:
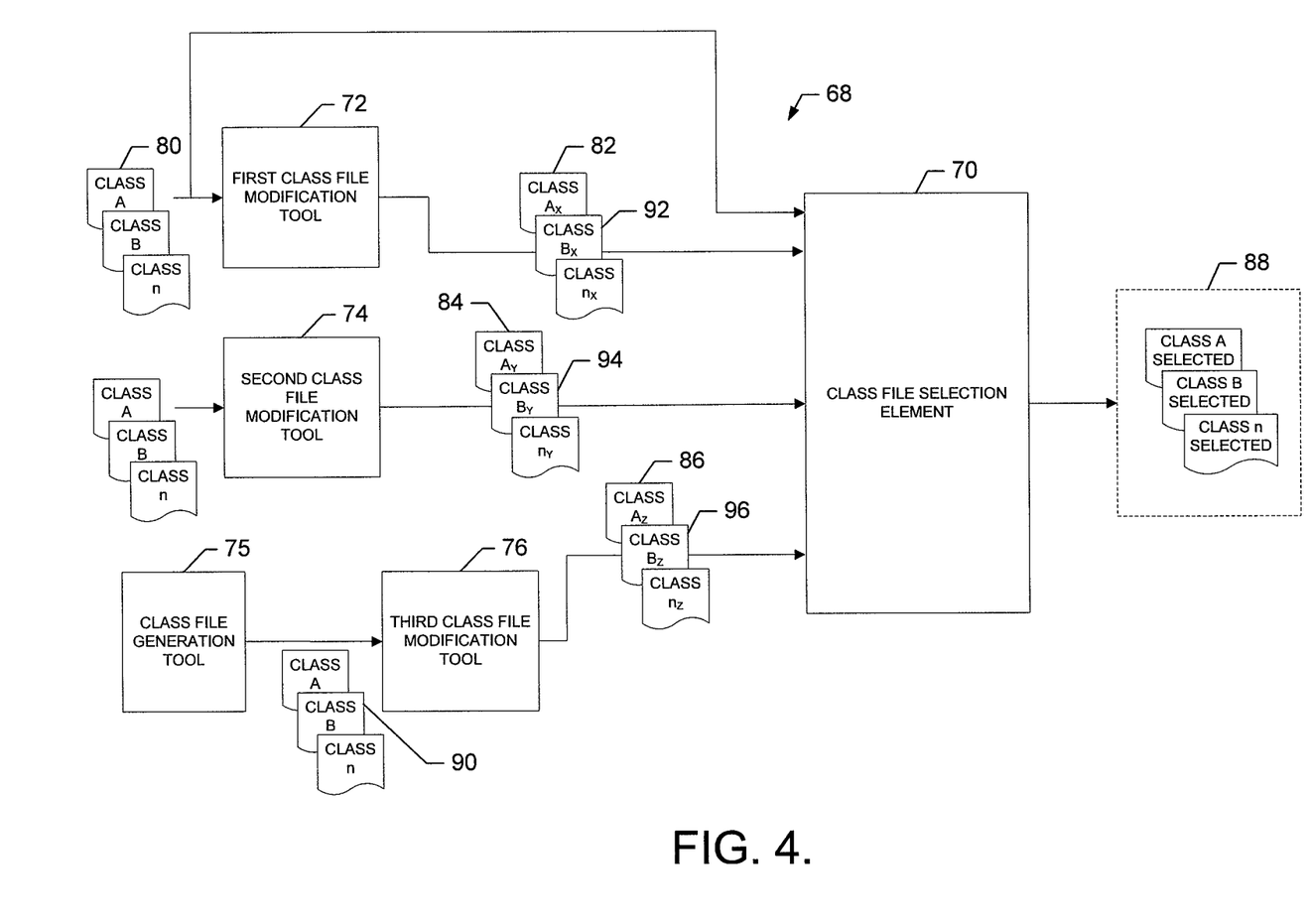
FIG. 4 is a diagram illustrating operation of the system according to an exemplary embodiment of the present invention.

Operation of the embodiment shown in FIG. 3 will now be described for purposes of example with reference to FIG. 4. FIG. 4 is a diagram illustrating operation of the system 68 according to an exemplary embodiment of the present invention. As shown in FIG. 4, the system 68 may apply the class file modification tools to a series of class files. For example, a first class file (e.g., class A 80) may be applied to the first class file modification tool 72 to produce a first modified class file (e.g., class $A_X$ 82), to the second class file modification tool 74 to produce a second modified class file (e.g., class $A_Y$ 84), and to the third class file modification tool 76 to produce a third modified class file (e.g., class $A_Z$ 86). A second class file (e.g., class B 90) may be applied to the first class file modification tool 72 to produce a first modified class B file (e.g., class $B_X$ 92), to the second class file modification tool 74 to produce a second modified class B file (e.g., class $B_Y$ 94), and to the third class file modification tool 76 to produce a third modified class B file (e.g., class $B_Z$ 96). Additional class files (e.g., class n) may each receive similar treatment to that described above with respect to the first and second class files.

The class file selection element 70 may be configured to select a smallest one from among each of the reference class files and the modified class files for each class. The selected file for each class may then be combined with the selected file for each other class to form the optimized class set 88. For example, the class file selection element 70 may be configured to select a smallest one from among class A 80, class $A_X$ 82, class $A_Y$ 84 and class $A_Z$ 86 and a smallest one from among class B 90, class $B_X$ 92, class $B_Y$ 94 and class $B_Z$ 96. The selection of the smallest file may be accomplished by performing operations such as MIN[A, $A_X$, $A_Y$, $A_Z$], MIN[B, $B_X$, $B_Y$, $B_Z$], MIN[n, $n_X$, $n_Y$, $n_Z$], etc. The optimized class set 88 may therefore comprise the selected class file of each of the classes (e.g., class A selected, class B selected, class n selected, etc.).

In an exemplary embodiment, the class file selection element 70 may further include a profiling data analysis element 81. The profiling data analysis element 81 may be any device or means embodied in either hardware, software, or a combination of hardware and software that is capable of examining profiling data 83 associated with each corresponding reference class file (e.g., class A 80, class B 90, etc.) to determine whether the corresponding reference class is performance critical. The profiling data 83 may indicate whether the reference class file corresponds to a class that is performance critical. In this regard, the profiling data 83 may be a list of classes that are performance critical. However, in an exemplary embodiment, each class could include metadata corresponding to the profiling data 83. Performance critical files may be determined during testing of class operation and marked as such with profiling data. As such, when loading or preparing to load each class, the profiling data 83 associated with each corresponding reference class file may be examined to determine whether the corresponding reference class file and/or corresponding modified class files should be size optimized. According to one example, the class file selection element 70 may receive reference class files and corresponding modified class files and discriminately select, for each class, a smallest file based on the corresponding profiling data 83. For example, if class A 80 is associated with profiling data indicating that class A 80 is a performance critical class, the class file selection element 70 may be configured to disregard size in selecting a class file for inclusion in the optimized class set 88. In this regard, the class file selection element 70 (or another element) could be configured to select one of the class files having optimized characteristics in accordance with predefined performance criteria. Alternatively, if the class file modification tools are optimizers (i.e., devices performing transformations for performance enhancement), the class file selection element 70 may be configured to select a smallest one of the optimized class files for inclusion in the optimized class set 88 (e.g., MIN[$A_X$, $A_Y$, $A_Z$], MIN[$B_X$, $B_Y$, $B_Z$], etc.).

Figure 5:
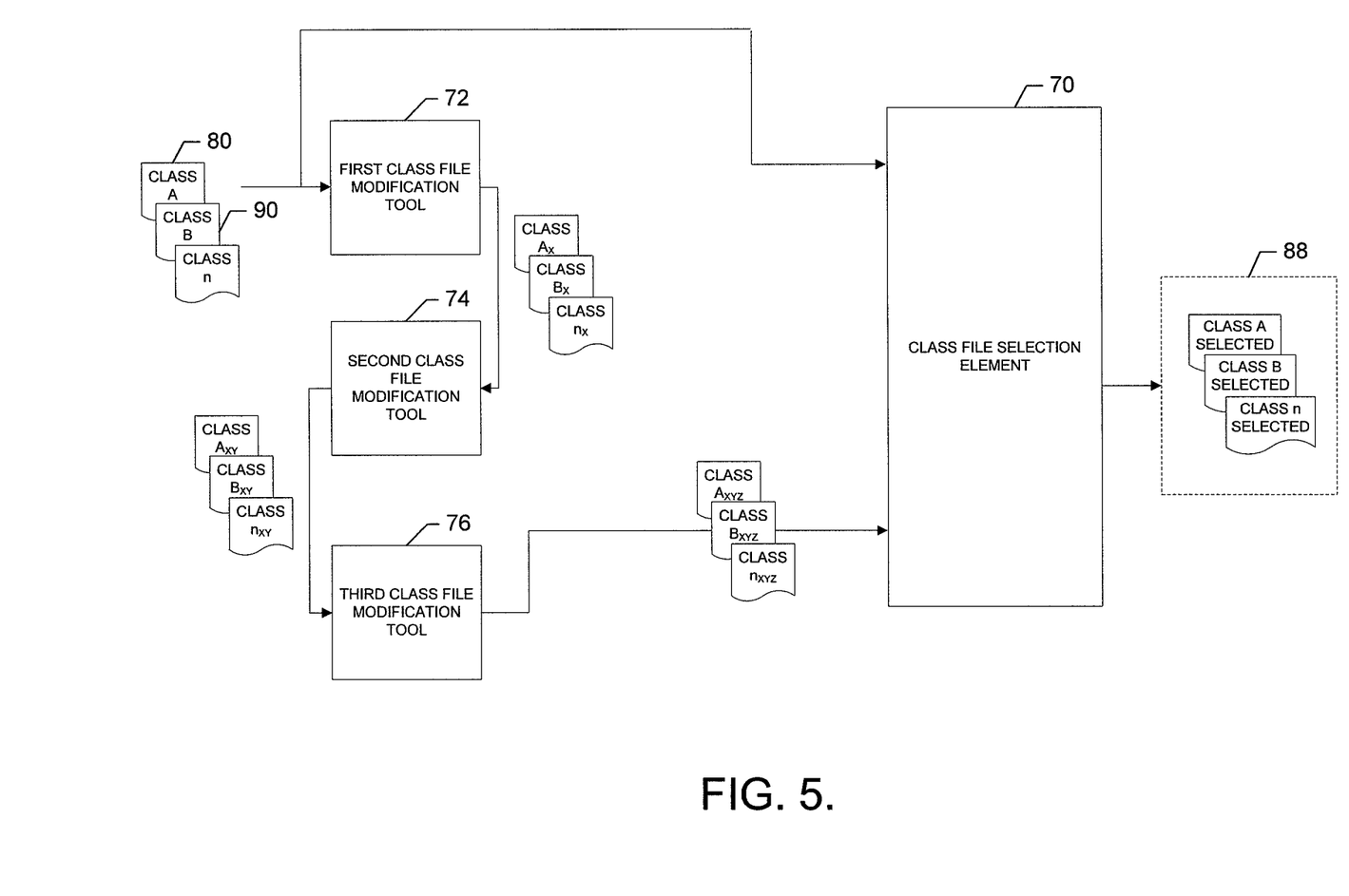
FIG. 5 is a diagram illustrating operation of the system according to an alternative exemplary embodiment of the present invention.

FIG. 5 is a diagram illustrating operation of the system 68 according to an alternative exemplary embodiment of the present invention. As shown in FIG. 5, each of the first, second and third first class file modification tools 72, 74 and 76 may be applied to each of the reference class files (e.g., class A 80, class B 90, etc.). Accordingly, a modified class A file (e.g., class $A_{XYZ}$) may be produced as an output of the first, second and third first class file modification tools 72, 74 and 76. Similarly, a modified class B file (e.g., class $B_{XYZ}$) may be produced as an output of the first, second and third first class file modification tools 72, 74 and 76. In other words, the class modification tools may be applied in sequence to produce the modified class A file, the modified class B file, etc. The class file selection element 70 may be configured to select a smallest one of the optimized class files for inclusion in the optimized class set 88 (e.g., MIN[A, $A_{XYZ}$], MIN[B, $B_{XYZ}$], etc.).

As stated above, romizing does not reduce bytecode size in a class file. However, embodiments of the present invention may be used in combination with bytecode optimizers or other class file output tools that are configured to or otherwise capable of reducing bytecode size of corresponding class files. Accordingly, after optimizing class files for each class, a size optimized one of either the reference class file or a modified class file may be selected in order to create an optimized class set which includes class files having a reduced memory footprint. The optimized class set may then be romized to reduce the footprint of the final stored class library. Accordingly, when romizing is used in addition to embodiments of the present invention, overall reductions in memory footprint size for class files may be achieved.

Figure 6:
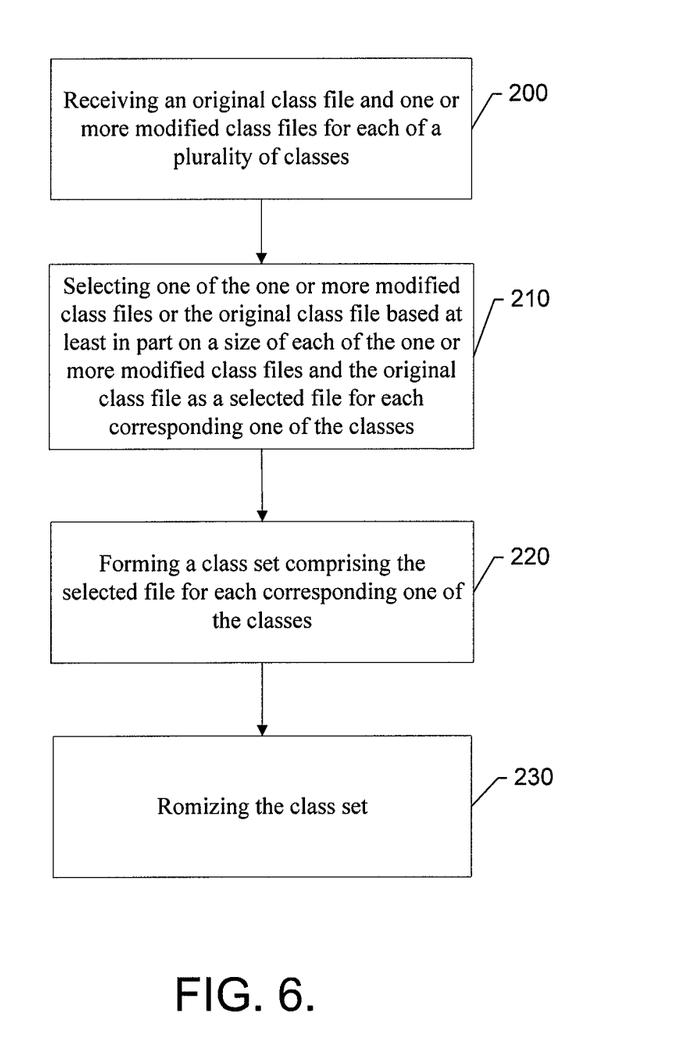
FIG. 6 is a flowchart according to an exemplary method for providing memory footprint reduction according to an exemplary embodiment of the present invention.

FIG. 6 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal and executed by a built-in processor in a mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing memory footprint reduction for classes of application or API code may include receiving a reference class file and one or more modified class files for each of a plurality of classes at operation 200. One of the one or more modified class files or the reference class file may be selected based at least in part on a size of each of the one or more modified class files and the reference class file as a selected file for each corresponding one of the classes at operation 210. At operation 220, a class set may be formed including the selected file for each corresponding one of the classes. In an exemplary embodiment, the method may further include romizing the class set at operation 230.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
   a processor; and
   a memory storing computer program code, the memory and computer program code configured to, with the processor cause the apparatus at least to:
   receive a reference class file for each of a plurality of classes and a plurality of modified class files for each of the plurality of classes, wherein the reference class file is a compiled class file, and the plurality of modified class files are compiled class files formed by modifying the compiled reference class file using a plurality of class file output tools, each of the plurality of class file output tools receiving as input the reference class file;
   select a selected file, among the reference class file and the plurality of modified class files for each corresponding one of the classes based at least in part on profiling data marking the reference class file, such that:
      for each class file associated with profiling data indicating that the corresponding class is not performance critical, one of the plurality of modified class files and the reference class file is selected based at least in part on a size of each of the plurality of modified class files and the reference class file, and
      for each class file associated with profiling data indicating that the corresponding class is performance critical, one of the plurality of modified class files and the reference class file is selected based at least in part according to pre-defined performance criteria disregarding size; and
   form a class set comprising the selected file for each corresponding one of the classes.

2. The apparatus of claim 1, wherein the plurality class files include at least one class file in which bytecode has been modified.

3. The apparatus of claim 2, wherein the memory and computer program code are further configured to, with the processor, cause the apparatus to receive the at least one class file in which the bytecode has been modified via communication with at least one of a bytecode optimizer, a compiler, or an obfuscator.

4. The apparatus of claim 1, wherein the memory and computer program code are further configured to, with the processor, cause the apparatus to receive at least one modified class file that has been modified by a plurality of class file modification tools.

5. The apparatus of claim 1, wherein the memory and computer program code are further configured to, with the processor, cause the apparatus to select only one of the plurality of modified class files in response to the profiling data indicating that the reference class file is performance critical.

6. The apparatus of claim 1, wherein the memory and computer program code are further configured to, with the processor, cause the apparatus to set select a class file from the one of the plurality of modified class files and the reference class file, the selected class file including the smallest bytecode size.

7. The apparatus of claim 1, wherein the apparatus is embodied in a mobile terminal.

8. A method comprising:
receiving a reference class file for each of a plurality of classes and a plurality of modified class files of the reference class file for each of the plurality of classes, wherein the reference class file is a compiled class file, and the one or more modified class files are compiled class files formed by modifying the compiled reference class file using a plurality of class file output tools, each of the plurality of class file output tools receiving as input the reference class file;
for each of the plurality of classes, comparing the reference class file and the plurality of modified class files;
selecting a selected file, via a processor, among the reference class file and the plurality of modified class files for each corresponding one of the classes based at least in part on profiling data marking the reference class file, such that:
for each class file having profiling data indicating that the corresponding class is not performance critical, one of the plurality of modified class files and the reference class file is selected based at least in part on a size of each of the plurality of modified class files and the reference class file, and
for each class file having profiling data indicating that the corresponding class is performance critical, one of the plurality of modified class files and the reference class file is selected based at least in part on pre-defined performance criteria, disregarding size; and
forming a class set comprising the selected file for each corresponding one of the classes.

9. The method of claim 8, wherein receiving the plurality class files comprises receiving at least one class file in which bytecode has been modified.

10. The method of claim 9, wherein receiving the at least one class file in which the bytecode has been modified further comprises receiving the at least one class file from at least one of:
a bytecode optimizer;
a compiler; or
an obfuscator.

11. The method of claim 8, wherein receiving the plurality of modified class files further comprises receiving at least one modified class file that has been modified by a plurality of class file modification tools.

12. The method of claim 8, wherein selecting among the reference class file and the plurality of modified class files further comprises selecting only one of the plurality of modified class files in response to the profiling data indicating that the reference class file is performance critical.

13. The method of claim 8, further comprising romizing the class set.

14. The method of claim 8, wherein selecting among the reference class file and the plurality of modified class files further comprises selecting a class file that includes the smallest bytecode size from the plurality of modified class files and the reference class file.

15. A non-transitory computer-readable storage medium comprising logic, the logic operable, when executed on a processor to:
receive a reference class file for each of a plurality of classes and a plurality of modified class files of the reference class file for each of the plurality of classes, wherein the reference class file is a compiled class file, and the plurality of modified class files are compiled class files formed by modifying the compiled reference class file using a plurality of class file output tools, each of the plurality of class file output tools receiving as input the reference class file;
for each of the plurality of classes, compare the reference class file and the plurality of modified class files;
select a selected file among the reference class file and the plurality of modified class files for each corresponding one of the classes based at least in part on profiling data marking the reference class file, such that:
for each class file associated with profiling data indicating that the corresponding class is not performance critical, one of the plurality of modified class files and the reference class file is selected based at least in part on a size of each of the plurality of modified class files and the reference class file, and
for each class file associated with profiling data indicating that the corresponding class is performance critical, one of the plurality of modified class files and the reference class file is selected based at least in part according to pre-defined performance criteria disregarding size; and
form a class set comprising the selected file for each corresponding one of the classes.

16. A non-transitory computer-readable storage medium of claim 15, wherein the logic is further operable to receive at least one class file in which bytecode has been modified.

17. A non-transitory computer-readable storage medium of claim 16, wherein the logic is operable to receive the at least one class file from at least one of:
a bytecode optimizer;
a compiler; or
an obfuscator.

18. The non-transitory computer-readable storage medium of claim 15, wherein the logic is operable to receive at least one modified class file that has been modified by a plurality of class file modification tools.

19. The non-transitory computer-readable storage medium of claim 15, wherein the logic is operable to select only one of the plurality of modified class files in response to the profiling data indicating that the reference class file is performance critical.

20. The non-transitory computer-readable storage medium of claim 15, wherein the logic is further operable to romize the class set.

21. The non-transitory computer-readable storage medium of claim 15, wherein logic is operable to select a class file from the plurality class files and the reference class file, the selected class file including the smallest bytecode size.

* * * * *